United States Patent

[11] 3,624,695

| [72] | Inventor | John R. Roberts, Jr. |
| | | P.O. Box 106, Buford, Ga. 30518 |
| [21] | Appl. No. | 877,288 |
| [22] | Filed | Nov. 17, 1969 |
| [45] | Patented | Nov. 30, 1971 |

[54] REMOVABLE SADDLE SEAT
5 Claims, 6 Drawing Figs.

| [52] | U.S. Cl. | 54/46 |
| [51] | Int. Cl. | B68c 01/20 |
| [50] | Field of Search | 54/44, 46, 41, 65, 66, 68 |

[56] References Cited
UNITED STATES PATENTS

| 286,674 | 10/1883 | Bassler | 54/46 |
| 426,934 | 4/1890 | Heffernan | 54/46 |
| 749,358 | 1/1904 | Brooke | 54/46 |
| 1,128,086 | 2/1915 | Wilson | 54/46 |
| 3,112,592 | 12/1963 | Schindler | 54/44 |

*Primary Examiner*—Hugh R. Chamblee
*Attorney*—Jones & Thomas

ABSTRACT: A removable saddle seat for horse saddles and the like, which includes a seat section for placement on the seat of the saddle and side jockeys which extend down from the side edges of the seat section. The side jockeys extend forwardly and curve around the pommel of the saddle, and tie straps are connected to the forward and rearward portions of the side jockeys. The tie straps at the forward portion of the side jockeys are normally tied together in front of the pommel, while the tie straps at the rearward portions of the side jockeys are normally tied together behind the cantle, to connect the forward and rearward portion of the saddle seat to the saddle. The saddle seat comprises an outer leather covering and an internal layer of padding which includes foam rubber and a tufted fabric.

PATENTED NOV 30 1971 3,624,695
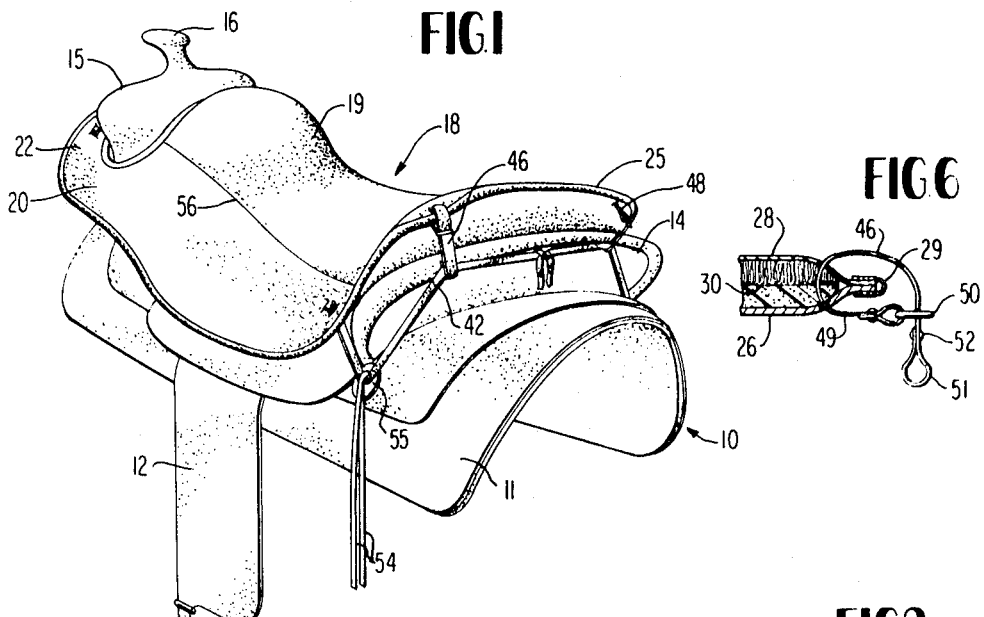
FIG.1
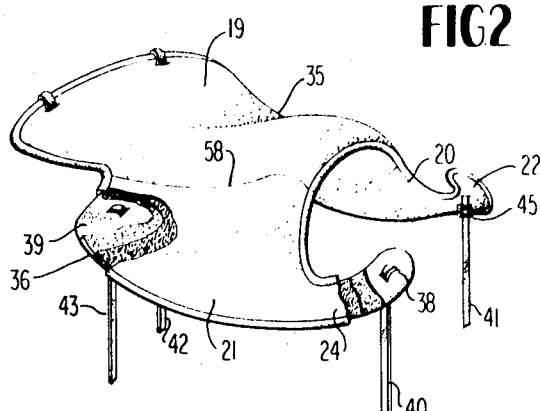
FIG.6
FIG.2
FIG.3
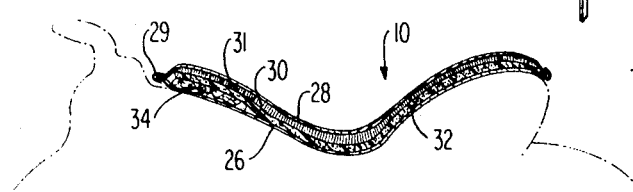
FIG.4
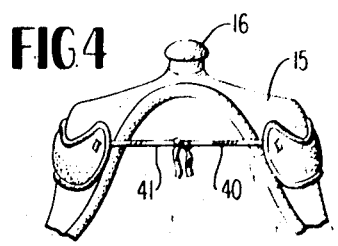
FIG.5
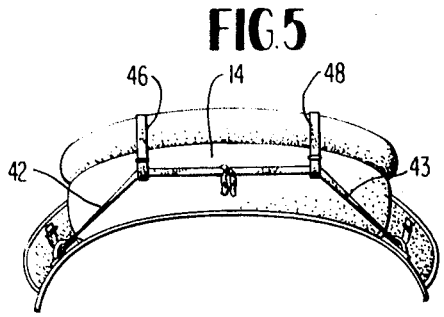
INVENTOR
JOHN R. ROBERTS, JR.
BY Jones & Thomas
ATTORNEYS 3,624,695

REMOVABLE SADDLE SEAT

BACKGROUND OF THE INVENTION

During the use of a saddle for horses it is sometimes desirable to soften the saddle seat or change the configuration of the saddle seat by the use of a pad or cushion. The seat of a well-made saddle is usually carefully sized and contoured so that it conforms to the size and shape of the rider. When a cushion is placed on the seat of a saddle, it usually changes the contour and size of the saddle so that the saddle no longer fits the original rider. Of course, when a different rider uses the saddle, the change in size and contour of the seat may be desirable.

While saddle pads of various shapes and configurations have been used from time to time, they have not been popular enough to manufacture on a large scale since the pads were difficult to attach to the saddles and frequently slipped from the desired positions so that the rider became uncomfortable. Furthermore, the addition of a pad or cushion to a saddle functions to change the contour of the saddle so that additional lumps, ridges and cavities were formed in the seating surface on which the rider rested, so that the carefully shaped saddle surface was obliterated. Thus, the previously known saddle cushions generally have been found to be unsatisfactory, since they were uncomfortable and difficult to maintain properly positioned on the saddle.

SUMMARY OF THE INVENTION

Briefly described, the present invention comprises a removable saddle seat assembly for connection to a horse saddle, or the like. The saddle seat assembly is shaped so that its bottom surface generally conforms to the seat and upper sides configuration of the saddle, and includes a seat section and side jockeys. The side jockeys extend about and around the pommel of the saddle, and tie straps are connected to the forward portions of the side jockey and are tied together in front of the pommel to positively connect the saddle seat to the forward portion of the saddle. Additional tie straps are connected to the rearward portions of the side jockeys and are tied together behind the cantle of the saddle to connect the saddle seat assembly to the rear portion of the saddle. In addition, holddown loops are connected to the rear edge of the seat section of the saddle seat assembly and are connected to the tie straps at a position behind the cantle of the saddle to hold the seat portion against the cantle of the saddle. The padding of the seat section and side jockeys of the saddle seat assembly is formed and shaped so that the same general configuration of the seat portion of the saddle is maintained, except that additional thickness of padding is used in the forward portion of the seat section to emphasize the concave portion of the seat formation and to minimize the slipping and sliding of the rider on the surface of the saddle seat assembly.

Thus, it is an object of this invention to provide a saddle seat assembly for use with a saddle, which is easy to connect and disconnect from a saddle and which does not destroy the seat configuration of the saddle.

Another object of this invention is to provide a removable seat assembly for connection to a saddle which functions to soften the seat surface of the saddle.

Another object of this invention is to provide a removable seat assembly for connection to a saddle, which can be easily connected to or disconnected from the saddle and yet is positively maintained in its proper location on the saddle during use without significant risk of slipping or sliding on the surface of the saddle.

Another object of this invention is to provide removable seat assembly for a saddle which is inexpensive to manufacture, and which can be utilized with various different saddles.

Other objects, features and advantages of the present invention will become apparent upon reading the following specification, when taken in conjunction with the accompanying drawing.

BRIEF DESCRIPTION OF THE DRAWING

FIG. 1 is a perspective view of a saddle with the removable saddle seat assembly attached thereto.

FIG. 2 is a perspective view of the removable saddle seat assembly, with portions broken away to expose internal portions of the assembly.

FIG. 3 is a side cross-sectional view of the removable saddle seat assembly, showing a saddle in dashed lines.

FIG. 4 is a front view of a saddle and the removable saddle seat assembly connected thereto.

FIG. 5 is a rear view of a saddle and the removable saddle seat assembly connected thereto.

FIG. 6 is a detail showing of a holddown loop.

DESCRIPTION OF THE PREFERRED EMBODIMENT

Referring now in more detail to the drawing, in which like numerals indicate like parts throughout the several views, FIG. 1 shows a saddle 10 having the conventional skirt 11, fender 12, stirrup 13, cantle 14, pommel 15, horn 16, and saddle seat surface (not shown) between cantle 14 and pommel 15. Cantle 14 is generally concave and conforms to the buttocks area of the rider. Pommel 15 can be of various different configurations, such as a cutter, roper, or any of the other conventional styles, but generally includes shoulders sloping downwardly from horn 16.

Removable saddle seat assembly 18 is applied to the seat surface of saddle 10 and includes seat section 19 and side jockeys 20 and 21. Seat section 19 generally conforms in size and shape to the seat section (not shown) of saddle 10. Side jockeys 20 and 21 are attached to the side edges of seat section 19 and extend in a downward direction over the upper portions of fenders 12 of the saddle. The forward portions 22 and 24 of side jockeys 20 and 21 curve around the shoulder portions of pommel 15 of saddle 10, so that the assembly generally fits about pommel 15. The rearward portion 25 of seat section 19 generally lies up in the concave portion of cantle 14.

As is best shown in FIGS. 2 and 3, removable saddle seat assembly 10 comprises a leather cover which includes a bottom sheet 26 and a top sheet 28 both fabricated of leather and bound and stitched together at their edges with binding 29. A back sheet 30 extends throughout the interior portion of the saddle seat assembly and the backing sheet is tufted so that one surface thereof has a mass of yarns 31 extending therefrom. The other surface of backing sheet 30 has a mass of foam rubber 32 applied thereto with adhesive. A buildup of soft fabric 34 is placed in the forward portion of seat section 19 beneath backing material 30. Soft fabric buildup 34 causes the forward portion of seat section 19 to extend or protrude gradually in an upward direction from the normal seat surface of the saddle, while the remaining portion of seat surface 19 generally conforms to the configuration of the seat surface of the saddle.

As is best illustrated in FIG. 2, forward portions 22 and 24 and rearward portions 35 and 36 of side jockeys 20 and 21, respectively, include reinforcing leather sheets, such as leather sheets 38 and 39 (the only ones shown). Tie straps 40, 41, 42, and 43 are connected to the forward and rearward portions of side jockeys 20 and 21. Tie straps 40–43 extend through bottom and top sheets 20 and 28, through backing sheet 30 and its layers of material, and through the reinforcing leather sheets 38 and 39. Each tie strap 40–43 includes a metal buckle, and the material of each tie strap is threaded through its metal buckle so that the tie straps cannot be pulled through the side jockeys. The metal buckles 45 are normally located on the bottom side of the saddle seat assembly, and only a small segment of each tie strap 40 is exposed on the upper surface of the saddle seat assembly (FIG. 1), to present an unencumbered and eye-appealing surface. The reinforcing leather sheets 38 and 39 are properly maintained within side jockeys 20 and 21 by the stitching of binding 29. Thus, tie straps 40-43 will be firmly connected to the forward and rearward portions of side jockeys 20 and 21 without substantial danger of the side jockeys being torn or damaged by an usually strong force being exerted on the tie straps.

As is best shown in FIG. 6, tiedown loops or connecting members 46 and 48 are connected to the rearward portion 25 of seat section 19 of saddle seat assembly 18. Tiedown loops 46 and 48 comprise strap 49 that extends through bottom and top sheets 26 and 28 and backing sheet 30 and around binding 29. A reinforcing leather sheet similar to sheets 38 and 39 can also be used at this point, if desired. Metal buckle 50 is connected to one end of strap 49, and the strap is threaded through its buckle. Strap 49 terminates in a loop 51 closed by brad 52. The strap 49 is of a length so that its loop 51 is extendable down over and behind cantle 14 of saddle 10.

As is best shown in FIGS. 1, 4, and 5, removable saddle seat assembly 18 is placed upon the seat portion of saddle 10 with the rearward portion 25 of section 19 lying in the concave cantle 14 and the forward portions 22 and 24 of side jockeys 20 and 21 extending around and in front of pommel 15. Tie straps 40 and 41 of the forward portions 22 and 24 of the side jockeys are tied together in front of pommel 15. This connects the forward portions of side jockeys 20 and 21 together about pommel 15 and connects seat assembly 18 to the forward portion of saddle 10. Tie straps 42 and 43 connected to the rearward portions of side jockeys 20 and 21 are threaded through the tie straps 54 extending from rosettes 55 on saddle 10 to hold the rearward portions of side jockeys 20 and 21 down against the saddle, and then are threaded through tiedown loops 46 and 48, and then are tied together behind cantle 14. This to hold side jockeys 20 and 21 toward the rear of the saddle. The tension in tie straps 42 and 43 draws tiedown loops 46 and 48 in a downward direction behind cantle 14 and functions to bend or taper the rearward portion 25 of seat section 19 about the ridge of the cantle, thus imparting a convex curvature to the upper edge of the rearward portion of the seat section. Moreover, the rearward portion 25 of seat section 19 is prevented from being inadvertently folded over in a forward direction by the movement of the rider's leg passing over the ridge of cantle 14 when mounting the saddle.

As is best illustrated in FIG. 3, the soft fabric buildup 34 within seat section 19 of the saddle seat assembly causes the top configuration of the seat section to be more concave than the original curvature of the seat section of the saddle. This causes the modified seat surface to conform more to the buttocks area of the rider and prevent the rider from sliding in a forward direction over the seat surface. Moreover, the manner in which soft fabric buildup 34 is placed in seat section 19 is such that the same texture of softness is present on the entire upper or outside surface of the saddle seat assembly, including both the seat surface 19 and side jockeys 20 and 21. Thus, a soft surface is provided for both the buttocks area and upper leg area of the rider, and virtually no protrusions, lumps, or cavities are created for the discomfort of the rider.

As is best shown in FIGS. 1 and 2, seams 56 and 58 delineate the seat section 19 from side jockeys 20 and 21. Seams 56 and 58 extend from the edge of the rounded cantle portion of the saddle seat assembly generally to the pommel section. The seams are placed in this manner so that they will not inhibit the bending of the saddle seat assembly into conformity with the configuration of the saddle surface, as might happen if the seams were oriented across the breadth of the saddle seat assembly. Seams 56 and 58 are placed so that they generally extend in an alignment with or as an extension of the curvature of the rearward portions 25 of seat section 19 toward the forward portion of seat section 19. This provides a natural flexible area in the material of the saddle seat assembly at the lines of intersection of the seat section with jockeys While this invention has been described in detail with particular reference to preferred embodiments thereof, it will be understood that variations and modifications can be effected within the spirit and scope of the invention as described hereinbefore and as defined in the appended claims.

I claim:

1. A removable seat assembly for connection to a horse saddle comprising a seat section for placement on the seat of a saddle, side jockeys extending from the sides of the seat section in a downward direction and extending forwardly of the seat section for extension around the pommel of the saddle, tie straps connected to said side jockeys at their forward and rearward edges whereby the tie straps at the rearward edges of the side jockeys can be extended behind the cantle of the saddle and tied together to connect the seat assembly to the saddle and the tie straps at the forward edges of the side jockeys can be extended in front of the pommel of the saddle and connected together to hold the seat assembly to the front of the saddle, and at least one connector loop connected to the rearward edge of the seat section of said seat assembly for extension over the cantle of the saddle whereby the tie straps connected at the rearward edges of the side jockeys can be extended through the connector loop and hold the rearward edge of the seat section against the cantle of the saddle.

2. In combination, a horse saddle comprising a seat surface terminating at its rear in a cantle and at its front in a pommel, a removable padded seat assembly extending over said seat surface and comprising a seat section and side jockeys extending in a downward direction on each side of said seat section, said side jockeys extending in a curved relationship forwardly around the sides and to the front of said pommel, tie straps connected to the forward portions of said side jockeys and tied together in front of said pommel to connect said padded seat assembly to the forward portion of said saddle, tie straps connected to the rearward portion of said side jockeys and tied together behind said cantle to connect said padded seat assembly to the rearward portion of said saddle, and at least one tiedown member connected to the rearward portion of said seat section and to the tie straps extending behind said cantle to hold down the rearward portion of said seat section.

3. A removable seat assembly for connection to a horse saddle comprising a seat section for placement on the seat of a saddle, side jockeys extending from the sides of the seat section in a downward direction and extending forwardly of the seat section for extension around the pommel of the saddle, and tie straps connected to said side jockeys at their forward and rearward edges whereby the tie straps at the rearward edges of the side jockeys can be extended behind the cantle of the saddle and tied together to connect the seat assembly to the saddle and the tie straps at the forward edges of the side jockeys can be extended in front of the pommel of the saddle and connected together to hold the seat assembly to the front of the saddle, said seat section and said side jockeys being constructed of layers of material including a bottom layer of leather, a top layer of leather, and an intermediate layer of material comprising a tufted backing sheet with a coating of foam rubber applied thereto.

4. The invention of claim 3 and wherein a layer of soft filler material is positioned between the bottom layer of leather and the intermediate layer of material at the forward portion of said seat section to build up the forward portion of said seat section.

5. The invention of claim 3 and wherein said top and bottom layers of leather are bound and stitched together at their edges.

* * * * *